(12) United States Patent
Takahashi et al.

(10) Patent No.: US 9,028,004 B2
(45) Date of Patent: May 12, 2015

(54) VEHICLE SEAT

(71) Applicants: Central Japan Railway Company, Nagoya-shi (JP); Tenryu Industries Co., Ltd., Toyama-shi (JP)

(72) Inventors: Yukio Takahashi, Nagoya (JP); Hiroki Tsunoda, Nagoya (JP); Soshi Kawakami, Nagoya (JP); Yuya Futamura, Nagoya (JP); Masaki Yamabe, Toyama (JP)

(73) Assignees: Central Japan Railway Company, Nagoya-Shi, Aichi (JP); Tenryu Industries Co., Ltd., Toyama-Shi, Toyama (JP)

( * ) Notice: Subject to any disclaimer, the term of this patent is extended or adjusted under 35 U.S.C. 154(b) by 0 days.

(21) Appl. No.: 14/059,829

(22) Filed: Oct. 22, 2013

(65) Prior Publication Data

US 2014/0117738 A1    May 1, 2014

(30) Foreign Application Priority Data

Oct. 31, 2012    (JP) .................................. 2012-240537

(51) Int. Cl.
  *B60N 2/72*    (2006.01)
  *B60N 2/70*    (2006.01)

(52) U.S. Cl.
  CPC ............ *B60N 2/7035* (2013.01); *B60N 2/7094* (2013.01); *B60N 2/72* (2013.01)

(58) Field of Classification Search
  USPC ............. 297/452.21, 452.23, 452.24, 452.26, 297/452.39, 452.56
  See application file for complete search history.

(56) References Cited

U.S. PATENT DOCUMENTS

| | | | |
|---|---|---|---|
| 6,158,815 A * | 12/2000 | Sugie et al. | 297/452.61 |
| 6,676,218 B2 * | 1/2004 | Fujita et al. | 297/452.49 |
| 7,252,341 B2 * | 8/2007 | Kircher et al. | 297/452.55 |
| 7,971,939 B2 * | 7/2011 | Fujita et al. | 297/452.56 |

FOREIGN PATENT DOCUMENTS

| | | |
|---|---|---|
| EP | 0 562 453 A1 | 9/1993 |
| GB | 1 402 556 | 8/1975 |
| JP | 57-65650 | 4/1982 |
| JP | 58-91952 | 6/1983 |
| JP | 61-25850 | 2/1986 |
| JP | 2-9835 | 8/1990 |
| JP | 05-104550 A | 4/1993 |
| JP | 2012-20083 A | 2/2012 |

OTHER PUBLICATIONS

Extended European Search Report dated Jan. 8, 2014.

* cited by examiner

*Primary Examiner* — Sarah B McPartlin
(74) *Attorney, Agent, or Firm* — McGinn IP Law Group, PLLC

(57) ABSTRACT

The present invention provides a vehicle seat which includes a seat frame, a seat cushion receiving member stretched across the seat frame, and a seat cushion placed on the seat cushion receiving member. In the vehicle seat, the seat cushion has such dimensions as to cover the seat frame as viewed in plan, and a lower surface of the seat cushion has a raised portion in a region covering the seat frame, and the raised portion is raised so as not to contact the seat frame.

13 Claims, 8 Drawing Sheets

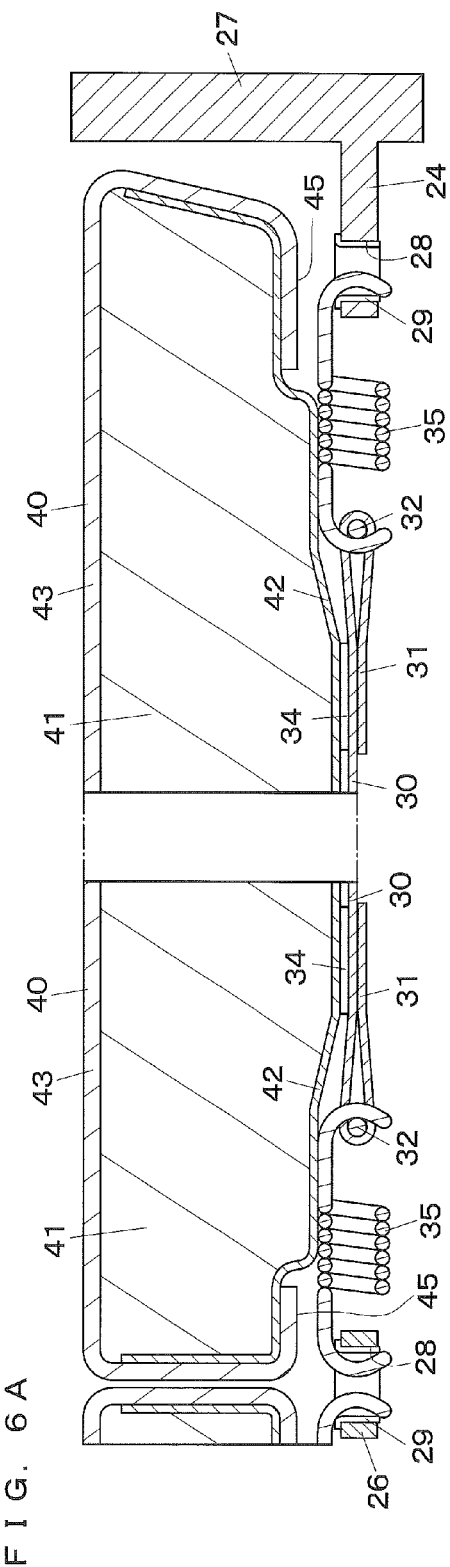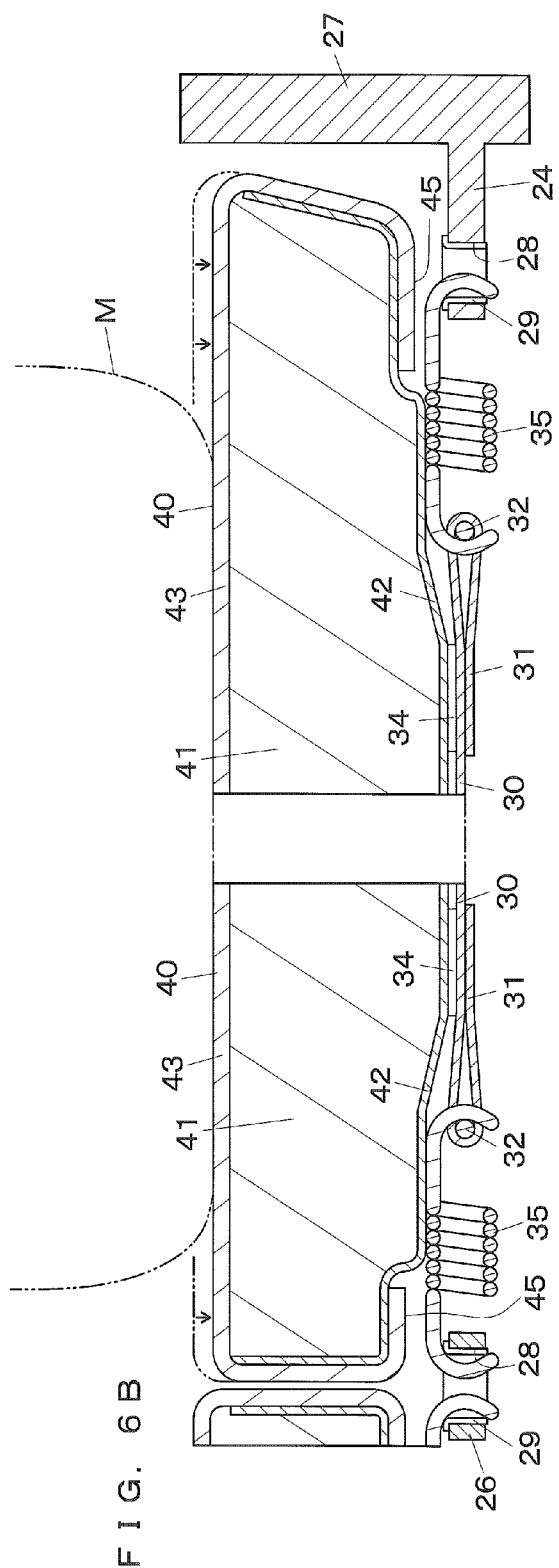

40

45

40

43

45

45

42

40

VEHICLE SEAT

TECHNICAL FIELD

The present invention relates to vehicle seats that are mounted on various vehicles such as track traveling vehicles, free traveling vehicles, ships, and airplanes, and more particularly to structures of seating portions.

BACKGROUND ART

Seating portions of vehicle seats are required to have a large elastic stroke for satisfactory seating comfort, and a reduced thickness for both reduced weight and space saving. In some examples of seating portion structures that can achieve both such an elastic stroke and a reduced thickness, a seat cushion receiving member that extends two-dimensionally is stretched across a seat frame via coil springs or by providing the seat cushion receiving member itself with elasticity, and a seat cushion is placed on the seat frame and the seat cushion receiving member. A large elastic stroke can be implemented by the seat cushion receiving member and the seat cushion, and a reduced thickness can be implemented because a thin seat cushion receiving member and a relatively thin seat cushion can be used.

Patent Literature 1 uses an elastic sheet such as a vinyl chloride sheet as a seat cushion receiving member. Patent Literature 2 uses wires as a seat cushion receiving member, and the wires are stretched across a seat frame via coil springs. S-shaped springs are also used as a seat cushion receiving member. Patent Literature 3 also uses wires as a seat cushion receiving member, and the wires are stretched across a seat frame via coil springs.

CITATION LIST

Patent Literature

Patent Literature 1: Japanese Patent Application Publication No. H05-104550
Patent Literature 2: Japanese Unexamined Utility Model Application Publication No. S58-91952
Patent Literature 3: Japanese Unexamined Utility Model Application Publication No. S57-65650

SUMMARY OF THE INVENTION

Technical Problem

Vibrations that are produced during traveling of a vehicle are transmitted to vehicle seats. Accordingly, it is preferable to minimize transmission of the vibrations to seated passengers. In the above conventional vehicular seats (Patent Literatures 1 to 3), even if the seat frame vibrates, the vibrations of the seat frame are absorbed due to the elasticity of the coil springs or the seat cushion receiving member, whereby vibrations of the seat cushion receiving member are suppressed. Accordingly, vibrations are less likely to be transmitted to a seat cushion placed on the seat cushion receiving member.

However, the cause, frequency, waveform, amplitude, etc. of vibrations that are produced during traveling of a vehicle differ from vehicle to vehicle, and the studies of the inventors show that, even with the above vehicle seats, vibrations may be considerably transmitted to a seated passenger depending on the type of vibrations. The reason for this is as follows. Since the seat cushion is sized to cover the seat frame as viewed in plan, not only the central portion of the seat cushion is placed on the seat cushion receiving member, but also the end portions of the seat cushion are placed on the seat frame. The contact area of the end portions of the seat cushion with the seat frame is much smaller than that of the central portion of the seat cushion with the seat cushion receiving member. However, vibrations are unexpectedly transmitted from the small contact area to the seat cushion depending on the type of vibrations, and are further transmitted to a seated passenger, thereby decreasing seating comfort.

In Patent Literature 3, the lower surface of the seat cushion has recesses corresponding to the coil springs. The seat cushion does not contact the coil springs due to the recesses, which allows the coil springs to smoothly expand and contract, and prevents generation of frictional noises. However, since the recesses do not correspond to the seat frame, the end portions of the seat cushion are placed on the seat frame.

It is an object of the present invention to provide a comfortable vehicle seat in which vibrations that are produced during traveling of a vehicle are less likely to be transmitted to a seat cushion.

Solution to Problem

A vehicle seat of an aspect of the present invention includes: a seat frame; a seat cushion receiving member stretched across the seat frame; and a seat cushion placed on the seat cushion receiving member, wherein the seat cushion has such dimensions as to cover the seat frame as viewed in plan, and a lower surface of the seat cushion has a raised portion in a region covering the seat frame, and the raised portion is raised so as not to contact the seat frame. Forms of the present invention will be described below.

1. Seat Frame

The seat frame may be in the form in which the seat cushion receiving member is stretched between two seat frames arranged next to each other at an interval therebetween in the lateral direction, in the form in which the seat cushion receiving member is stretched between two seat frames arranged next to each other at an interval therebetween in the longitudinal direction, in the form in which the seat cushion receiving member is stretched across four seat frames forming a quadrilateral frame, etc.

2. Seat Cushion Receiving Member

Any seat cushion receiving member that extends two-dimensionally and that can be stretched across the seat frame can be used as the seat cushion receiving member. For example, (a) a sheet made of fabric, resin, rubber, etc., (b) a mesh made of fabric, resin, metal, etc., (c) a plurality of wires arranged parallel to each other, (d) a plurality of S-shaped springs arranged parallel to each other, etc. may be used as the seat cushion receiving member.

The seat cushion receiving member may have its ends directly connected to the seat frame, or may have its ends connected the seat frame via springs such as coil springs. In the case of using a seat cushion receiving member having substantially no elasticity such as a fabric sheet, it is preferable to use the latter connection in order to increase an elastic stroke when a passenger is seated on the vehicle seat. Namely, it is preferable to connect the ends of the seat cushion receiving member to the seat frame via springs.

3. Raised Portion of Seat Cushion

The raised portion may have the following shapes, although the shape of the raised portion is not particularly limited.

(i) Hook shape in cross section: the lower surface of the seat cushion is raised in a stepped fashion in the region covering the seat frame with respect to the lower surface of the seat cushion in the region covering the seat cushion receiving member.

(ii) Tilted shape in cross section: the lower surface of the seat cushion is gradually raised in the region covering the seat frame with respect to the lower surface of the seat cushion in the region covering the seat cushion receiving member.

If the raised portion is raised so as not to contact the seat frame when no passenger is seated on the seat cushion, the contact force of the raised portion with the seat frame is reduced even when the raised portion contacts the seat frame when a passenger is seated on the seat cushion. Thus, vibrations that are produced during traveling of a vehicle are less likely to be transmitted from the seat frame to the seat cushion. This suppresses vibrations that are transmitted to a seated passenger, and improves seating comfort.

If the raised portion is raised so as not to contact the seat frame even when a passenger is seated on the seat cushion and the seat cushion is compressed and deformed, vibrations that are produced during traveling of the vehicle are not directly transmitted from the seat frame to the seat cushion (although the vibrations are transmitted thereto via the seat cushion receiving members). This more reliably suppresses vibrations that are transmitted to the seated passenger, and further improves seating comfort. It is therefore preferable that the raised portion be raised so as not to contact the seat frame even when a passenger weighing 70 kg is seated on the seat cushion. In this case, even if a lighter passenger weighing less than 70 kg is seated on the seat cushion, the amount of compression deformation of the seat cushion is merely reduced as compared to the case where a passenger weighing 70 kg is seated on the seat cushion, and therefore the raised portion does not contact the seat frame. The standard body weight of Japanese males is currently 64 kg. It is more preferable that the raised portion be raised so as not to contact the seat frame even when a passenger weighing 95 kg is seated on the seat cushion. In this case, the raised portion does not contact the seat frame even if a passenger weighing less than 95 kg is seated on the seat cushion.

4. Combined Forms

The following preferred forms can be implemented by combinations of the elements described above.

(1) The seat cushion receiving member is a sheet, and is stretched across the seat frame via a coil spring, the lower surface of the seat cushion contacts the seat cushion receiving member and an end of the coil spring which is located closer to the seat cushion receiving member, and the raised portion is formed so as to contact neither an end of the coil spring which is located closer to the seat frame nor the seat frame. The end of the coil spring which is located closer to the seat frame tends to vibrate in response to vibrations of the seat frame. However, the end of the coil spring which is located closer to the seat cushion receiving member is less likely to vibrate as the coil spring absorbs vibrations. It is therefore preferable that the raised portion be formed so as not to contact the end of the coil spring which is located closer to the seat frame. The seat cushion has lower shape keeping property in the raised portion due to its reduced thickness. It is therefore preferable that the raised portion be not excessively large. Accordingly, the lower surface of the seat cushion is formed so as to contact the end of the coil spring which is located closer to the seat cushion receiving member so that the raised portion does not become excessively large.

(2) The seat cushion receiving member is a sheet, and is stretched across the seat frame via a coil spring, the lower surface of the seat cushion contacts the seat cushion receiving member, and the raised portion is formed so as to contact neither the coil spring nor the seat frame. As compared to the form (1), this form (2) has a larger raised portion, and the seat cushion therefore has lower shape keeping property in the raised portion, but vibrations that are transmitted from the coil spring to the seat cushion are further reduced.

5. Vehicles

Vehicles to which the vehicle seat of the present invention can be applied are not particularly limited, but include (a) track traveling vehicles traveling along various tracks such as railway vehicles, (b) free traveling vehicles traveling freely on a road such as buses, (c) ships, (d) airplanes, etc.

Advantageous Effects of Invention

The vehicle seat of the present invention is advantageous in that vibrations that are produced during traveling of a vehicle are less likely to be transmitted to a seat cushion, and great seating comfort is implemented.

BRIEF DESCRIPTION OF DRAWINGS

FIGS. 6A and 6B are enlarged sectional views of a main part of the vehicle seat in FIG. 5, where FIG. 6A is a sectional view when no passenger is seated on the vehicle seat, and FIG. 6B is a sectional view when a passenger is seated on the vehicle seat;

FIG. 7A is a plan view, FIG. 7B is a bottom view, and FIG. 7C is a side view.

DESCRIPTION OF EMBODIMENTS

Figure 1:
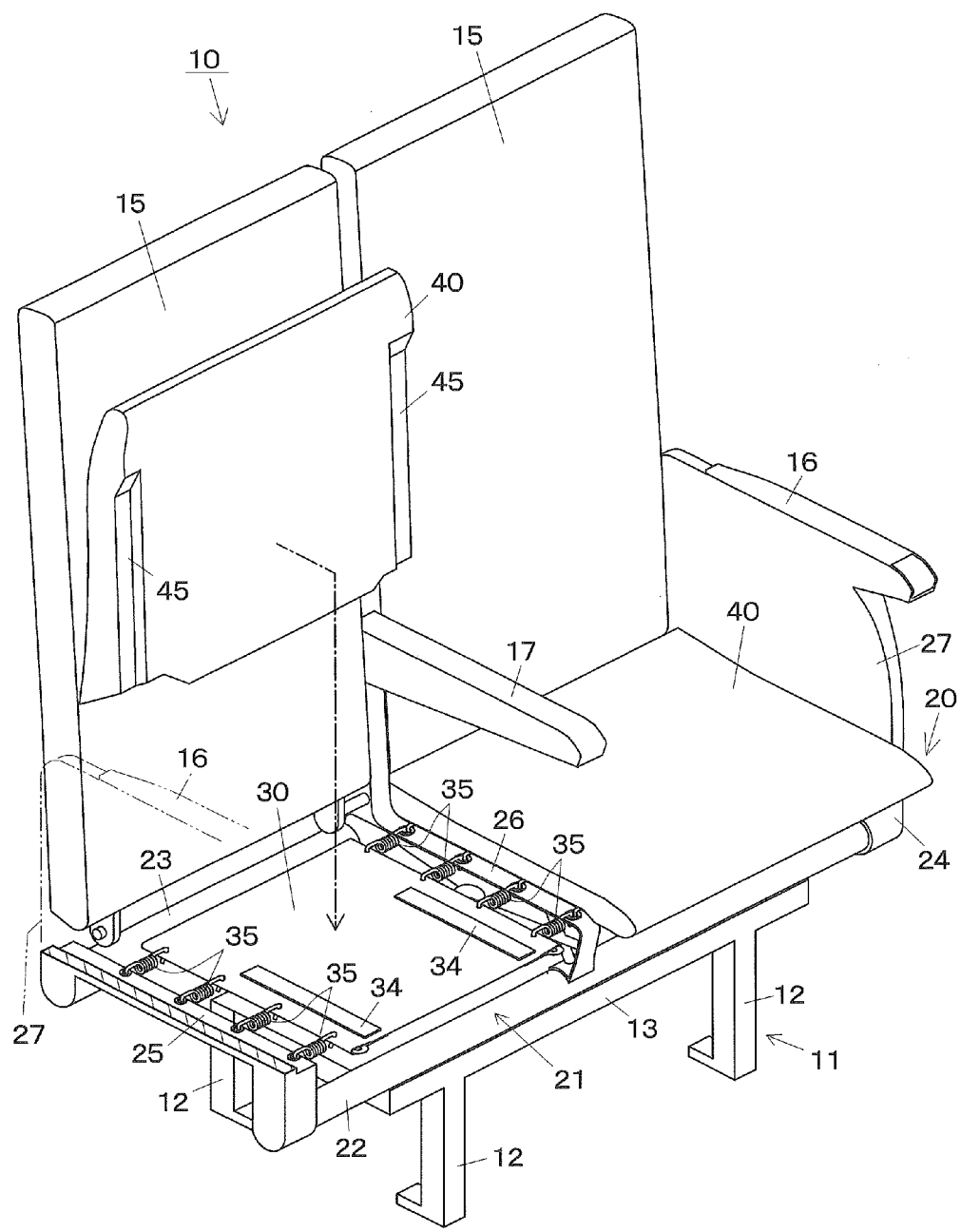
FIG. 1 is a perspective view of a vehicle seat according to a first embodiment of the present invention.
Figure 2:
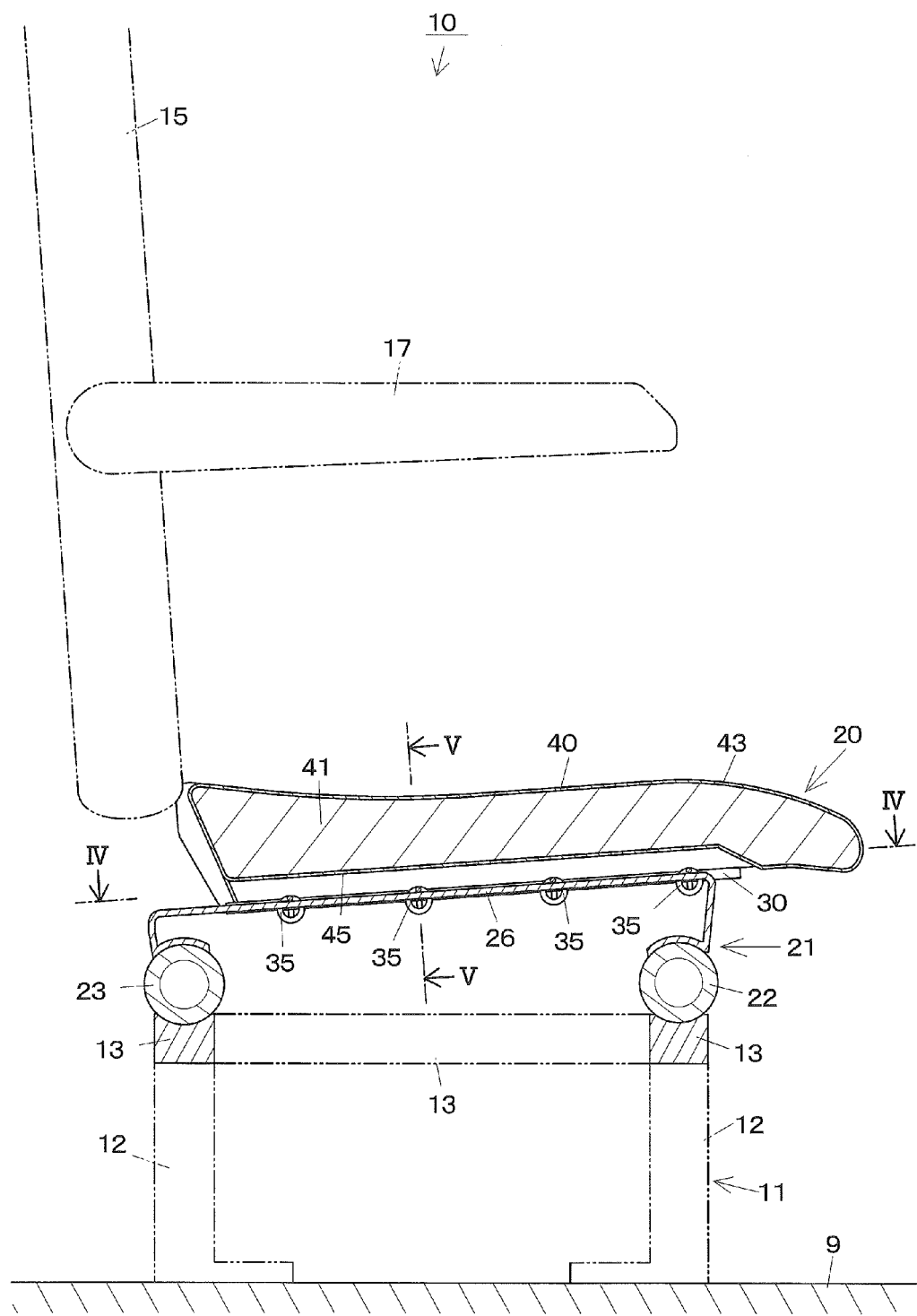
FIG. 2 is a sectional view of the vehicle seat taken along line II-II in FIG. 4.
Figure 3:
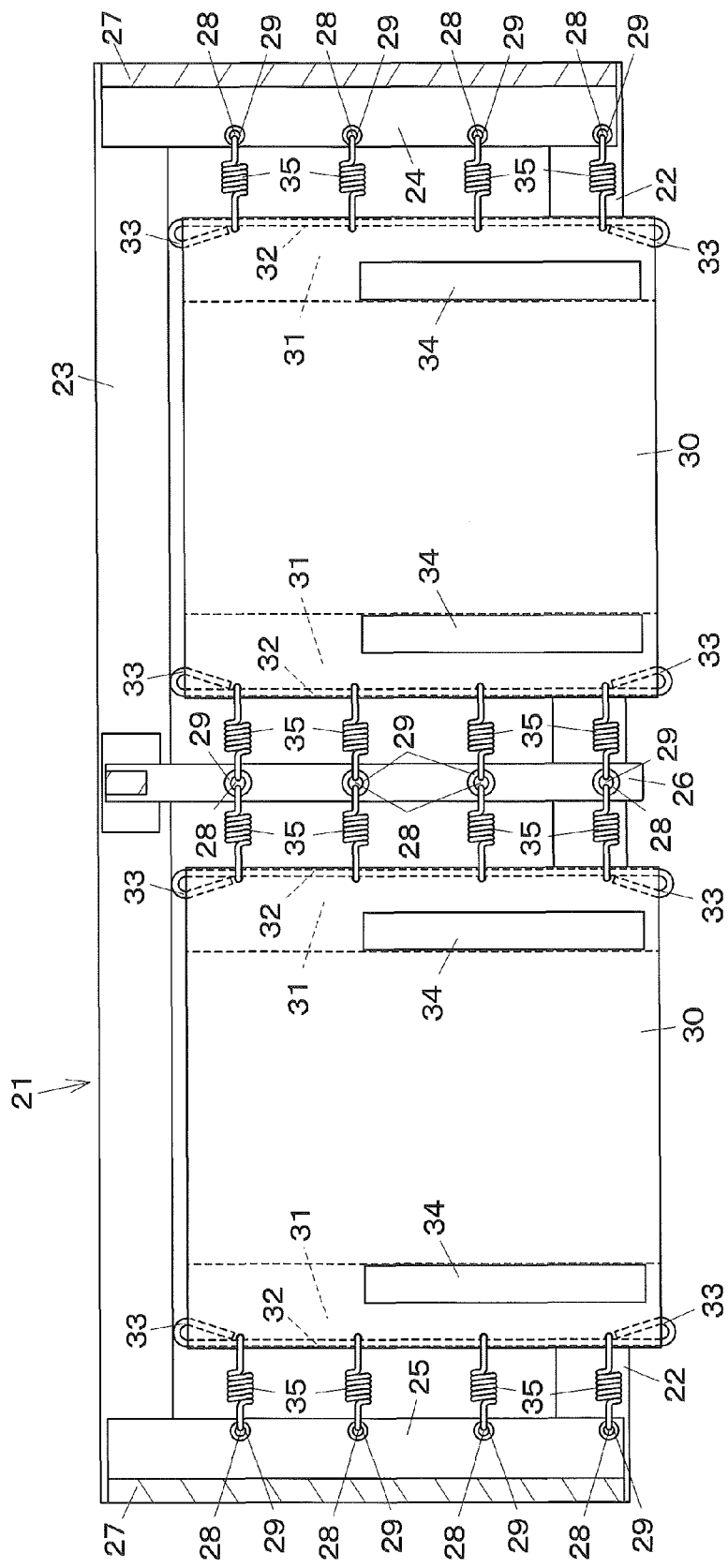
FIG. 3 is a plan view of the vehicle seat with seat cushions removed therefrom.
Figure 4:
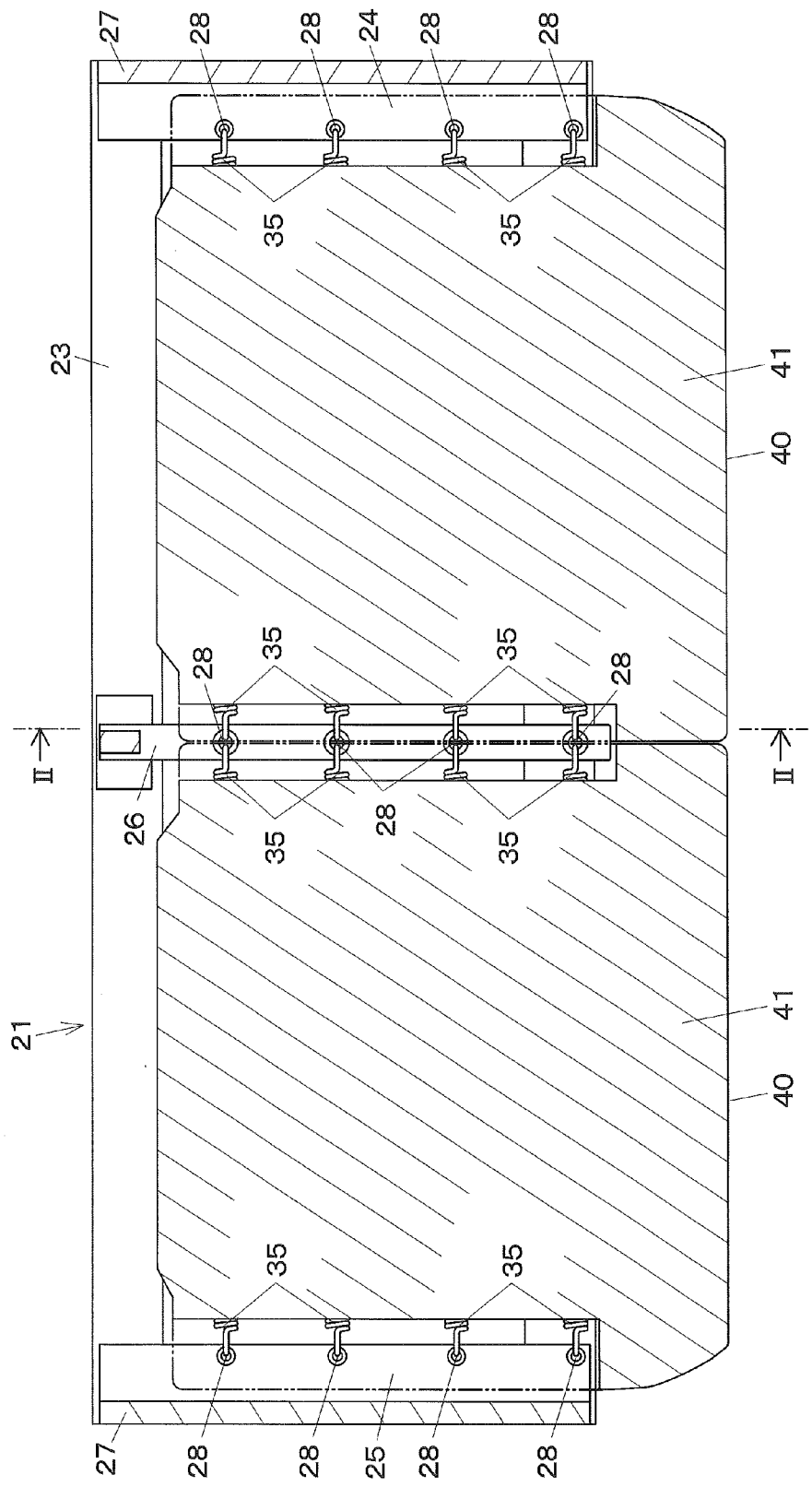
FIG. 4 is a sectional view of the vehicle seat taken along line IV-IV in FIG. 2.
Figure 5:
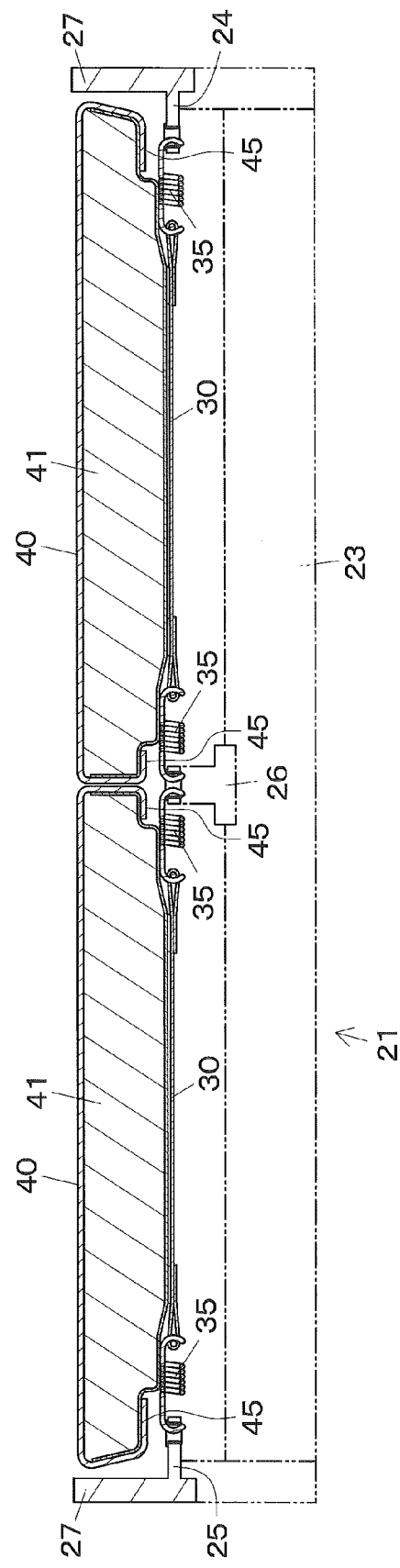
FIG. 5 is a sectional view of the vehicle seat taken along line V-V in FIG. 2.
Figure 7A:
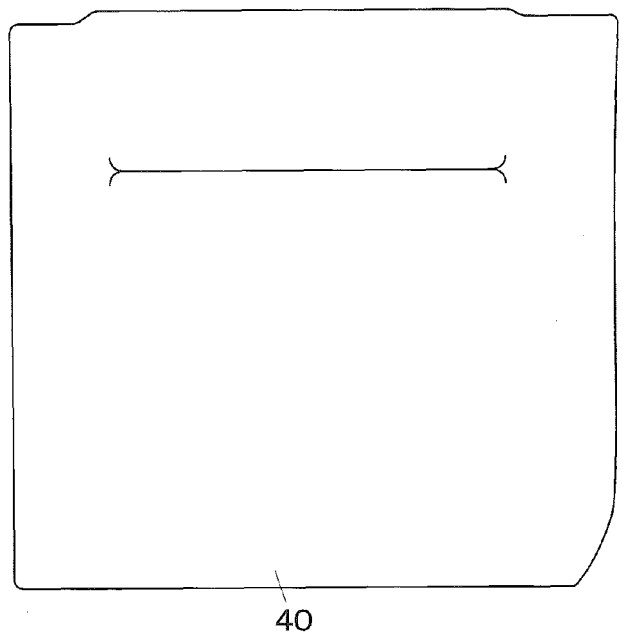
FIGS. 7A to 7C show a seat cushion of the vehicle seat, where
Figure 7C:
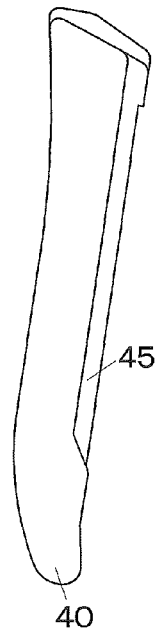
Figure 7B:
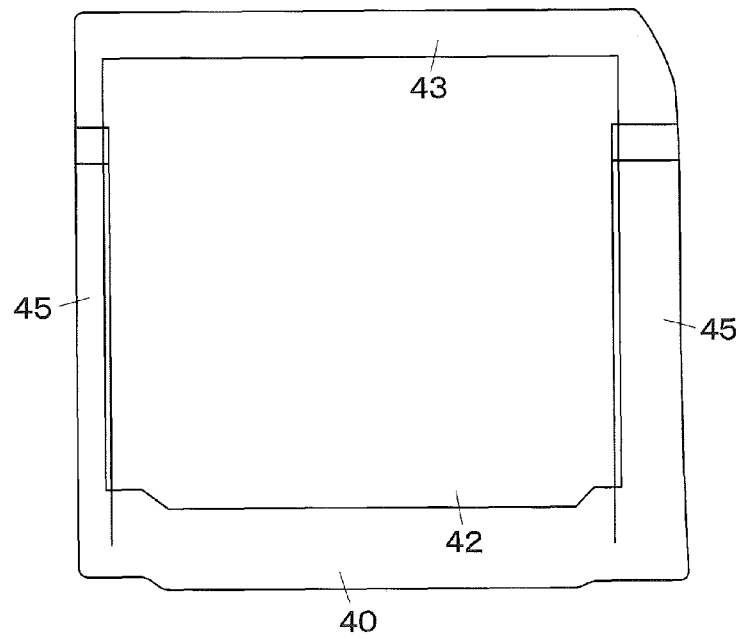

A vehicle seat includes: a seat frame; a seat cushion receiving member stretched across the seat frame; and a seat cushion placed on the seat cushion receiving member. The seat cushion has such dimensions as to cover the seat frame as viewed in plan. The lower surface of the seat cushion has a raised portion in a region covering the seat frame, and the raised portion is raised so as not to contact the seat frame.

First Embodiment

A vehicle seat 10 of a first embodiment shown in FIGS. 1 to 7C is a seat for seating two passengers, which is suitable for track traveling vehicles, and includes a leg portion 11, a seating portion 20, a backrest portion 15, and armrest portions 16, 17. In the following description, "right" and "left" mean right and left as viewed from a seated passenger, and are opposite to right and left as viewed in the figures.

The leg portion 11 is formed by a plurality of legs 12 fixed to a floor surface 9, and a joint 13 connecting the upper ends of the legs 12.

The seating portion 20 includes a seat frame 21 disposed on the joint 13 via a rotating mechanism (not shown) that changes the direction of the seat as the traveling direction of the track traveling vehicle changes, two seat cushion receiving members 30 each stretched across (the inner space of) the seat frame 21, and two seat cushions 40 placed on the respective seat cushion receiving members 30.

The seat frame 21 is formed by front and rear frames 22, 23 extending in the lateral direction and parallel to each other at an interval therebetween in the longitudinal direction, left and right frames 24, 25 extending in the longitudinal direction at a position above the front and rear frames 22, 23 and connecting the left ends and right ends of the front and rear frames 22, 23, and a center frame 26 extending at a position above the front and rear frames 22, 23 and connecting the centers in the lateral direction of the front and rear frames 22, 23. Each of the left and right frames 24, 25 thus extends parallel to the center frame 26 at an interval therebetween in the lateral direction, and each of the front and rear frames 22, 23 is disposed slightly below the left and right frames 24, 25 and the center frame 26. Each of the left and right frames 24, 25 and the center frame 26 has a plurality of (four) hook holes 28 extending therethrough and arranged at substantially regular intervals in the longitudinal direction. Protective bushes 29 are fitted in the respective hook holes 28. Left and right armrest frames 27 are formed integrally with the left and right frames 24, 25, respectively.

One of the two seat cushion receiving members 30 is stretched between the left frame 24 and the center frame 26 via coil springs 35, and the other of the two seat cushion receiving members 30 is stretched between the right frame 25 and the center frame 26 via coil springs 35. Each seat cushion receiving member 30 is a fabric sheet having a substantially rectangular shape with a width smaller than the distance between the left or right frame 24, 25 and the center frame 26. The left and right ends of the seat cushion receiving member 30 are folded back and sewn to form a bag portion 31, and a tension bar 32 is inserted in the bag portion 31 so as to extend in the longitudinal direction. Each coil spring 35 has a hook portion at its both ends. The hook portion at one end of the coil spring 35 extends through the seat cushion receiving member 30 at a position inward of the tension bar 32 in the seat cushion receiving member 30, and is hooked on the tension bar 32, and the hook portion at the other end of the coil spring 35 is hooked on the protective bush 29 in the hook hole 28 of the frame 24, 25, 26. With the elastic force of the coil springs 35, the tension bars 32 tense the seat cushion receiving member 30 uniformly in the lateral direction. Each of the front and rear ends of the tension bar 32 is folded back in a loop shape to form a folded-back portion 33. The hook portions of the foremost and rearmost coil springs 35 are engaged with the folded-back portions 33 of the tension bar 32, so that the tension bar 32 does not come off from the seat cushion receiving member 30. A hook-and-loop fastener 34 is sewn at a plurality of positions on the upper surface of the seat cushion receiving member 30.

Each of the two seat cushions 40 is formed by a cushion core 41 made of urethane foam and having a substantially rectangular shape, a hook-and-loop fastener 42 which is bonded to the surface of the cushion core 41 so as to cover the bottom surface and a part of the side surface of the cushion core 41, and an upholstery 43 bonded to the surface of the cushion core 41 so as to cover the upper surface, the side surface, and a part of the bottom surface of the cushion core 41. The seat cushion 40 is placed on the seat cushion receiving member 30, and is fastened to the seat cushion receiving member 30 by attaching the hook-and-loop fastener 42 to hook-and-loop fastener 34.

The left seat cushion 40 has such dimensions that it covers the front frame 22, the rear frame 23, the left frame 24, and the left half of the center frame 26 of the seat frame 21 as viewed in plan. The lower surface of the seat cushion 40 has raised portions 45 in the regions covering the left frame 24 and the left half of the center frame 26. Namely, the lower surface of the seat cushion 40 has raised portions 45 along its left and right ends. The raised portions 45 are raised in a stepped fashion so as not to contact the left frame 24 and the left half of the center frame 26, and have a hook shape in cross section. Namely, a height level of the lower surface of the raised portion 45 is higher than that of the lower surface of the seat cushion 40 in the region not having the raised portion 45.

More specifically, the lower surface of the seat cushion 40 contacts the seat cushion receiving member 30 and the ends of the coil springs 35 which are located closer to the seat cushion receiving member 30, and each of the raised portions 45 has such a lateral width that it contacts neither the ends of the coil springs 35 which are located closer to the seat frame 21 nor the left frame 24 or the left half of the center frame 26. Each of the raised portions 45 is not only raised so as not to contact the left frame 24 or the left half of the center frame 26 when no passenger is seated on the seat cushion 40 as shown in FIG. 6A, but also raised so as not to contact the left frame 24 or the left half of the center frame 26 even when a passenger M weighing 95 kg is seated on the seat cushion 40 and the seat cushion 40 is compressed and deformed as shown in FIG. 6B. As described above, the front frame 22 and the rear frame 23 are disposed slightly below the left frame 24 and the center frame 26. The lower surface of the seat cushion 40 therefore contacts neither the front frame 22 nor the rear frame 23 along its front and rear ends.

The right seat cushion 40 has such dimensions that it covers the front frame 22, the rear frame 23, the right frame 25, and the right half of the center frame 26 of the seat frame 21 as viewed in plan. The lower surface of the seat cushion 40 has raised portions 45 in the regions covering the right frame 25 and the right half of the center frame 26. Namely, the lower surface of the seat cushion 40 has raised portions 45 along its left and right ends. The raised portions 45 are raised in a stepped fashion so as not to contact the right frame 25 and the right half of the center frame 26, and have a hook shape in cross section. More specifically, the right seat cushion 40 is basically similar to the left seat cushion 40 except the positional relation in the lateral direction.

The backrest portion 15 is attached to the seat frame 21 in a reclinable manner. The left and right armrest portions 16 are supported by the armrest frames 27, respectively. The center armrest portion 17 is supported by the center frame 26.

According to the vehicle seat 10 of the first embodiment described in detail above, the seat cushions 40 have the raised portions 45 raised so as not to contact the left frame 24, the right frame 25, the center frame 26, and the ends of the coil springs 35 which are located closer to the seat frame 21. Accordingly, vibrations that are produced during traveling of the vehicle are not directly transmitted from the seat frame 21 and the ends of the coil springs 35 which are located closer to the seat frame 21 to the seat cushions 40 (although the vibrations are transmitted thereto via the seat cushion receiving members 30). This reliably suppresses vibrations that are transmitted to the seated passenger, and implements great seating comfort.

Second Embodiment

Figure 8A:
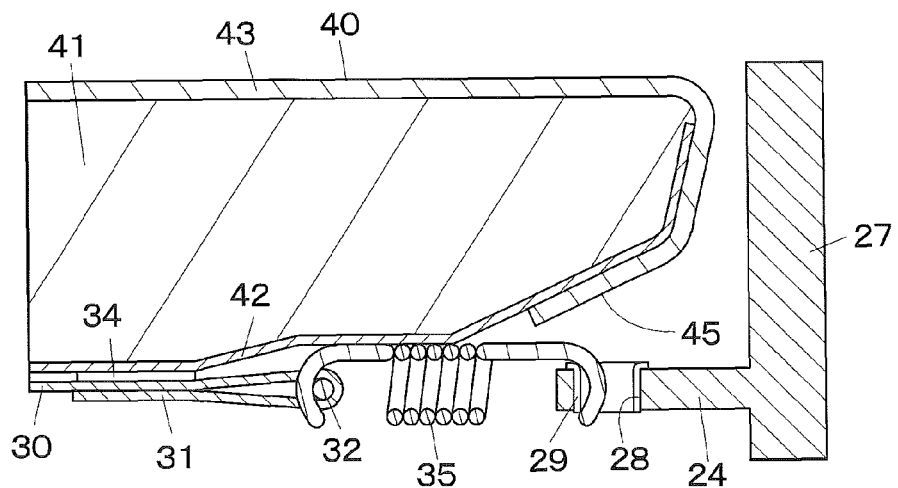
FIG. 8A is a sectional view of a main part of a second embodiment.

A second embodiment shown in FIG. 8A is different from the first embodiment only in that the lower surface of the seat cushion 40 is gradually raised in the region covering the seat frame 21 (in the illustrated example, the left frame 24) with respect to the lower surface of the seat cushion 40 in the region covering the seat cushion receiving member 30 so as to form a tilted shape in cross section. The second embodiment is otherwise the same as the first embodiment. The second embodiment also has advantages similar to those of the first embodiment.

Third Embodiment

Figure 8B:
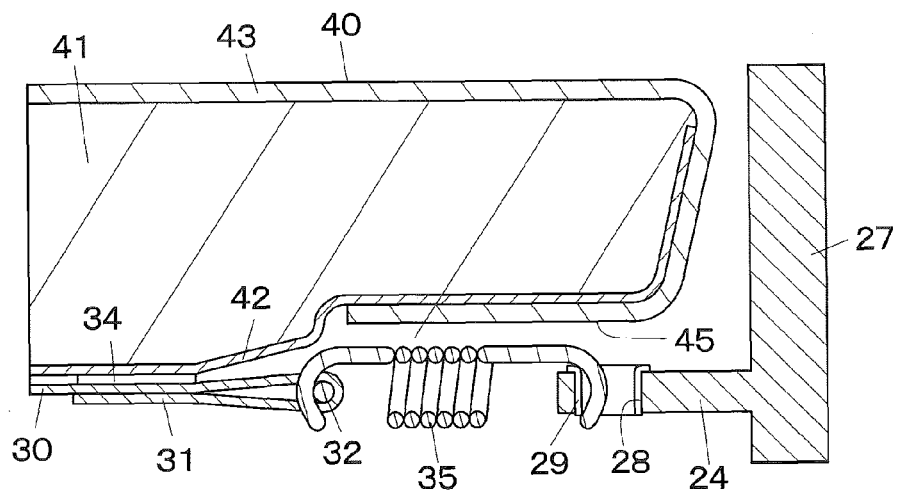
FIG. 8B is a sectional view of a main part of a third embodiment.

A third embodiment shown in FIG. 8B is different from the first embodiment only in that the lower surface of the seat cushion 40 contacts only the seat cushion receiving member 30 and the raised portions 45 are formed so as to contact neither the (entire) coil springs 35 nor the seat frame 21 (in the illustrated example, the left frame 24). The third embodiment is otherwise the same as the first embodiment. The third embodiment basically has advantages similar to those of the first embodiment. More specifically, as compared to the first embodiment, the raised portions 45 have a greater lateral width, and the shape keeping property in the raised portions 45 of the seat cushion 40 is reduced accordingly. However, this configuration further reduces vibrations that are transmitted from the coil springs 35 to the seat cushion 40.

The present invention is not limited to the above embodiments, and may be modified as appropriate without departing from the spirit and scope of the invention.

REFERENCE SIGNS LIST 10 vehicle seat
21 seat frame
24 left frame
25 right frame
26 center frame
30 seat cushion receiving member
35 coil spring
40 seat cushion
45 raised portion

The invention claimed is:
1. A vehicle seat, comprising:
a seat frame;
a seat cushion receiving member stretched across the seat frame; and
a seat cushion placed on the seat cushion receiving member so as to contact the seat cushion receiving member when the seat cushion is unoccupied,
wherein the seat cushion has such dimensions as to cover the seat frame as viewed in plan,
wherein a lower surface of the seat cushion has a raised portion in a region covering the seat frame, the raised portion being raised so as not to contact the seat frame when the seat cushion is unoccupied, thereby any portion of the seat cushion does not contact the seat frame,
wherein the seat cushion receiving member comprises a sheet, and is stretched across the seat frame via a coil spring, and
wherein the coil spring is the only spring interposed between the seat frame and the seat cushion.
2. The vehicle seat according to claim 1, wherein
the raised portion is raised so as not to contact the seat frame even when a passenger weighing 70 kg is seated on the seat cushion.
3. The vehicle seat according to claim 1, wherein
the lower surface of the seat cushion contacts the seat cushion receiving member and an end of the coil spring which is located closer to the seat cushion receiving member, and
the raised portion is formed so as to contact neither an end of the coil spring which is located closer to the seat frame nor the seat frame.
4. The vehicle seat according to claim 1, wherein
the lower surface of the seat cushion contacts the seat cushion receiving member, and
the raised portion is formed so as to contact neither the coil spring nor the seat frame.
5. The vehicle seat according to claim 1, wherein
the raised portion is raised in a stepped fashion with respect to the lower surface of the seat cushion in a region covering the seat cushion receiving member so as to form a hook shape in cross section.
6. The vehicle seat according to claim 1, wherein
the raised portion is gradually raised with respect to a portion of the lower surface of the seat cushion in a region covering the seat cushion receiving member so as to form a tilted shape in cross section.
7. The vehicle seat according to claim 1, wherein the seat cushion receiving member comprises a mesh.
8. The vehicle seat according to claim 1, wherein the seat cushion receiving member comprises a plurality of wires arranged in parallel.
9. The vehicle seat according to claim 1, wherein
the raised portion is raised so as not to contact the seat frame even when a passenger weighing up to 70 kg is seated on the seat cushion.
10. The vehicle seat according to claim 1, wherein
the raised portion is raised so as not to contact the seat frame even when a passenger weighing up to 95 kg is seated on the seat cushion.
11. The vehicle seat according to claim 1, wherein the lower surface of the seat cushion contacts the seat cushion receiving member, and
wherein the raised portion is formed so as not to contact the coil spring.
12. The vehicle seat according to claim 1, wherein the raised portion is formed so as not to contact the coil spring.
13. The vehicle seat according to claim 1, wherein the raised portion is formed so as not to contact an end of the coil spring which is located closer to the seat frame.

* * * * *